United States Patent [19]

Narayan

[11] Patent Number: 4,743,626

[45] Date of Patent: May 10, 1988

[54] LIQUID CARBODIIMIDE-URETONIMINE MODIFIED POLYMETHYLENE POLYPHENYLENE POLYISOCYANATES AND POLYURETHANE FOAMS MADE THEREFROM

[75] Inventor: Thirumurti Narayan, Grosse Ile, Mich.

[73] Assignee: BASF Corporation, Parsippany, N.J.

[21] Appl. No.: 95,680

[22] Filed: Sep. 14, 1987

[51] Int. Cl.$^4$ .............................................. C08G 18/14
[52] U.S. Cl. .............................. 521/160; 252/182.22; 252/182.21; 548/952
[58] Field of Search .................. 521/160; 548/952; 252/182

[56] References Cited

U.S. PATENT DOCUMENTS

| | | | |
|---|---|---|---|
| 3,891,578 | 6/1975 | Kan et al. | 521/107 |
| 4,284,730 | 8/1981 | Nanayan et al. | 521/125 |
| 4,424,288 | 1/1984 | Patton et al. | 521/125 |

*Primary Examiner*—Maurice J. Welsh
*Attorney, Agent, or Firm*—Bill C. Panagos; Joseph D. Michaels

[57] ABSTRACT

A process for the preparation of liquid polymethylene polyphenylene polyisocyanate blends containing carbodiimide-uretonimine isocyanate linkages, containing a high two-ring methylene bis(phenylisocyanate) content, and light colored polyurethane foams made therefrom. The process is comprised of reacting polymethylene polyphenylene polyisocyanate with a catalytically effective amount of a carbodiimide-uretonimine promoting compound at a temperature sufficient to promote the formation of carbodiimide-uretonimine linkages and an isocyanate content of about 25 percent and the desired viscosity is reached, and then reacting that product to deactivate the carbodiimide-uretonimine catalyst, and finally blending two ring methylene bis(phenylisocyanate) with the product to produce a mixture having a two ring isocyanate content of about 60 percent of the total ring content and a viscosity comparable to standard polymeric MDI. Urethane foams made from this material are lighter in color than those formed from standard polymeric MDI.

9 Claims, No Drawings

LIQUID CARBODIIMIDE-URETONIMINE MODIFIED POLYMETHYLENE POLYPHENYLENE POLYISOCYANATES AND POLYURETHANE FOAMS MADE THEREFROM

BACKGROUND OF THE INVENTION

2. Field of the Invention

The present invention relates to a process for making a carbodiimide-uretonimine-modified polymethylene polyphenylene polyisocyanate composition and urethane foams made therefrom. This invention further relates to producing a carbodiimide-uretonimine-modified polymethylene polyphenylene polyisocyanate composition which has a relatively high two-ring methylene bis(phenylisocyanate) (MDI) content and a viscosity comparable to standard polymeric MDI (PMDI) as is known to those skilled in the art.

This invention further relates to the production of rigid and flexible foams prepared from high two-ring containing carbodiimide-uretonimine-modified methylene bis(phenylisocyanates) which are substantially lighter in color than those prepared from standard viscosity polymethylene polyphenylene polyisocyanates.

2. Description of the Material Art

Narayan et al, U.S. Pat. No. 4,284,730, disclose a liquid carbodiimide, and uretonimine-isocyanurate-containing polyisocyanate composition and microcellular foams made therefrom. The compositions are prepared in the presence of the appropriate catalysts by partially trimerizing a mixture of polyisocyanate and carbodiimide and uretonimine containing polyisocyanates with a trimer catalyst to the desired polyisocyanate levels. Sequential, partial carbodiimization occurs, followed by partial trimerization of a polyisocyanate to the desired free isocyanate level. Another approach is the partial trimerization of a polyisocyanate followed by partial carbodiimization. Yet another approach taught is the simultaneous conversion using a mixed catalyst of carbodiimide and isocyanurate catalyst, to the desired free isocyanate level. Finally, the liquid polyisocyanate is blended with carbodiimide-containing polyisocyanates and isocyanurate containing polyisocyanates to the desired isocyanate level.

The present invention differs from Narayan because the Narayan reference does not contemplate the use of polymethylene polyphenylene polyisocyanates. Moreover, there is no showing in the Narayan disclosure of blending carbodiimide-uretonimine modified polyisocyanates with a two-ring polymeric MDI to obtain a light colored polyisocyanate mixture containing at least 60 percent two-ring MDI content and having a viscosity comparable to a polymeric MDI.

Patton, Jr. et al, U.S. Pat. No. 4,424,288, disclose carbodiimide-modified polymethylene polyphenylene polyisocyanates and their use in the preparation of polyisocyanurate polyurethane foams. The Patton patent teaches a liquid carbodiimide-modified organic polyisocyanate prepared by reacting a crude polymethylene polyisocyanate containing an isomer mixture of 4,4'-, 2,4'- and 2,2'-methylene bis(phenylisocyanate) and an effective amount of a carbodiimidization catalyst. The polyisocyanate/polyurethane foams were made by reacting the modified polyisocyanates with polyols in the presence of various trimerization catalysts.

Patton, Jr. et al differ from the present invention because there is no showing in Patton of mixing the carbodiimide, uretonimine-modified polymethylene polyphenylene polyisocyanates with methylene bis(phenylisocyanate) (MDI) to obtain a mixture with a relatively high two-ring content, i.e. about 60 percent two-ring content, and a viscosity which is comparable to standard polymeric MDI. Further, there is no showing in Patton, Jr. et al of the production of a polyurethane foam packaging material which is substantially lighter in color than polyurethane foams which were possible using carbodiimide-modified polymethylene polyphenylene polyisocyanates of Patton.

Kan, U.S. Pat. No. 3,891,578, discloses carbodiimide isocyanurate foams containing urethane linkages which are characterized by low friability and good flame resistance. The carbodiimide isocyanurate foams are prepared by mixing a polyisocyanate, a polyol and a catalyst system comprising an S-triazine compound and a catalyst which promotes urethane linkages. The present invention differs from Kan et al because there is no showing in Kan of mixing a carbodiimide modified polyisocyanate with a standard two-ring PMDI polyisocyanate mixture to achieve a carbodiimide, uretonimine-modified isocyanurate mixture which contains 60 percent two-ring MDI content and has a viscosity comparable to standard PMDI. Further, there is no showing that it is possible with Kan et al to make a polyurethane foam packaging material which is substantially lighter in color than that possible using standard PMDI alone.

SUMMARY OF THE INVENTION

This invention relates to the preparation of polymethylene polyphenylene polyisocyanate compositions containing carbodiimide, uretonimine linkages and a high two-ring MDI content by catalyzing the polymethylene polyphenylene polyisocyanate with a carbodiimide-uretonimine promoting compound, such as phospholene oxide catalysts at a temperature sufficient to promote the formation of carbodiimide-uretonimine linkages. When the final product has an isocyanate content of about 25 percent, and the desired viscosity is reached, a carbodiimide-uretonimine promoter deactivator, such as a trifluoromethone sulfonic acid, is added to deactivate the phospholene oxide catalyst. The resulting carbodiimide, uretonimine-modified polymethylene polyphenylene polyisocyanate compositions are then blended with a methylene bis(phenylisocyanate) (MDI). Mixing with the MDI raises the two ring MDI content from about 25 percent to about 60 percent. In this manner, a 60 percent plus two ring content mixture is achieved which has a viscosity of about 200 mPas, which is comparable to standard PMDI.

The polyisocyanate of the present invention is useful in the preparation of flexible and rigid foams which have a lighter color when compared to those from normal standard polymeric MDI. Further, although these compositions contain more than a 60 percent two ring MDI content, their viscosity is comparable to standard polymeric MDI which has only 45 percent two ring MDI content.

DETAILED DESCRIPTION OF THE PREFERRED EMBODIMENT

The present invention deals with modified stable liquid polyisocyanate compositions comprising carbodiimide-uretonimine-containing polyisocyanates and blending these modified polyisocyanates with a methylene bis(phenylisocyanate) composition comprised of 2,2'-, 2,4'-, and 4,4'-methylene bis(phenylisocyanate)

compositions and mixtures thereof. The invention further relates to foams and molded products made therefrom.

The polyisocyanate compositions are generally of a lighter color, low viscosity liquids displaying excellent room temperature storage stability. The carbodiimide and uretonimine structure as shown below.

OCN—R—NCO + OCN—R—N=C=N—R—NCO ⇌

+

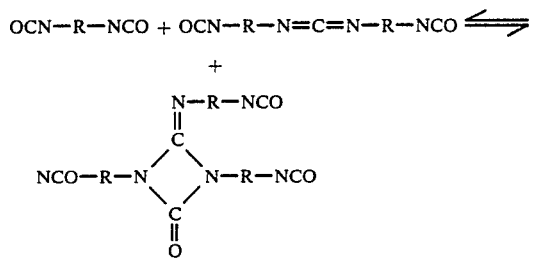

The organic polyisocyanate employed in the instant invention are polymethylene polyphenylene polyisocyanates with viscosities ranging from about 200 to 2000 mPas.

The polyisocyanate compositions of the present invention may be prepared by employing well known carbodiimide-promoting compounds as catalysts. The carbodiimide catalysts employed in accordance with the present invention may be any of those known in the art as being useful in the conversion of an isocyanate to the corresponding carbodiimide. Illustrative of such catalysts are:

(a) phospholene 1-oxides and 1-sulfides having the formulae:

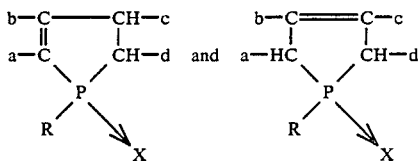

wherein a, b, c and d are each selected from the group consisting of hydrogen and hydrocarbyls from 1 to 12 carbon atoms inclusive, R is selected from the group consisting of lower alkyl and aryl and X is selected from the group consisting of oxygen and sulfur. The above phospholene compounds and methods for their preparation are described in U.S. Pat. Nos. 2,663,737; 2,663,738; and 2,853,473. The 3-phospholenes can be isomerized readily to the corresponding 2-phospholenes by thermal treatment or by refluxing with an aqueous base as disclosed by Quinn et al, *Journal American Chemical Society*, 33, 1024, 1968. Representative compounds within the above class are 1-phenyl-2-phospholene-1-oxide; 3-methyl-1-phenyl-2-phospholene-1-oxide; 1-phenyl-2-phospholene-1-sulfide; 1-ethyl-phospholene-1-oxide; 1-ethyl-3-methyl-2-phospholene-1-oxide; 1-ethyl-3-methyl-2-phospholene-1-sulfide; and the isomeric phospholanes corresponding to the above-named compounds. Also, polymer bound phospholene oxide may be employed, specifically those having the recurring units, for example,

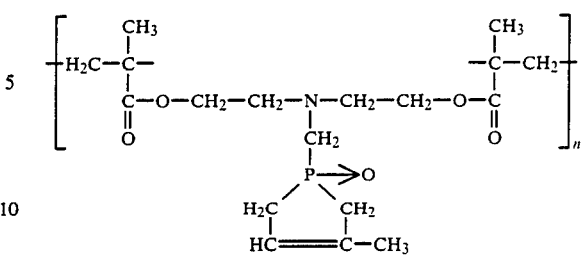

as disclosed in U.S. Pat. No. 4,105,643, as well as those of the structure as disclosed in U.S. Pat. No. 4,105,642:

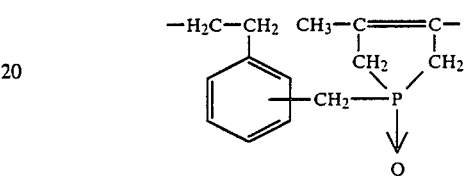

(b) diaza- and oxaza-phospholanes and -phosphorinanes of the formula:

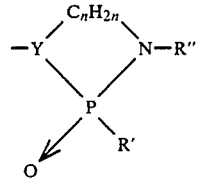

where $C_nH_{2n}$ represents alkylene from 1 to 12 carbon atoms, inclusive, at least one and not more than three adjacent carbon atoms and said alkylene radical forming a chain, one end of which is attached to Y, the other end of which is attached to N, thereby completing the heterocyclic ring; R' is selected from the group consisting of hydrocarbyl-containing 1 to 12 carbon atoms, inclusive; and halo, nitro, alkoxy, alkyl, mercapto, and cyano-substituted hydrocarbyl from 1 to 12 carbon atoms, inclusive; R' is hydrocarbyl containing from 1 to 12 carbon atoms, inclusive, and Y is selected from the group consisting of —O— and —NR''— wherein R'' has the significance as defined above. These compounds and methods for preparation are described in U.S. Pat. No. 3,522,303. Representative examples of such compounds are: 2-ethyl-1,3-dimethyl-1,3,2-diazaphospholane-2-oxide; 2-chloromethyl-1,3-dimethyl-1,3,2-diazaphospholane-2-oxide; 2-trichloromethyl-1,3-dimethyl-1,3,2-diazaphospholane-2-oxide; 2-phenyl-1,3-dimethyl-1,3,2-diazaphospholane-2-oxide; 2-phenyl-1,3-dimethyl-1,3,2-diaza-phosphorinane-2-oxide; 2-benzyl-1,3-dimethyl-1,3,2-diazaphospholane-2-oxide; 2-allyl-1,3-dimethyl-1,3,2-diazaphospholane-2-oxide; 2-bromomethyl-1,3-dimethyl-1,3,2-diazaphospholane-2-oxide; 2-cyclohexyl-1,3-dimethyl-1,3,2-diazaphospholane-2-oxide; 2-(2-ethoxyethyl)-1,3-dimethyl-1,3,2-diazaphospholane-2-oxide; 2-naphthyl-1,3-dimethyl-1,3,2-diazaphospholane-2-oxide and mixtures thereof.

(c) Triaryl arsines wherein the aryl groups are free from substituents containing reactive hydrogen atoms, said arsine being represented by the formula:

wherein each of the R, R₁ and R₂ represents the same or different aryl moieties having from 6 to 12 carbon atoms, inclusive. Such compounds are described in U.S. Pat. No. 3,406,198. Representative examples are: triphenylarsine, tris(p-tolyl)arsine, tris(methoxyphenyl)arsine, tris(p-ethoxyphenyl)arsine, tris(p-chlorophenyl)arsine, tris(p-fluorophenyl)arsine, tris(2,5-xylyl)arsine, tris(p-cyanophenyl)arsine, tris(1-naphthyl)arsine, tris(p-methylmercaptophenyl)arsine, tris(p-biphenyl)arsine, p-chlorophenyl bis(p-tolyl)arsine and phenyl(p-chlorophenyl) (p-bromophenyl)arsine.

(d) Aslo included are compounds of the formula:

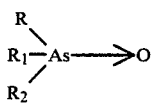

wherein each R₁, R₂, and R₃ represents the same or different alkyl or aryl groups having from 6 to 12 carbon atoms, inclusive. Representative examples of such are triphenylarsine oxide, triethylarsine oxide, and polymer bound arsine oxide such as are described in U.S. Pat. No. 4,143,063:

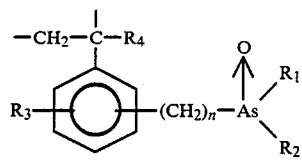

wherein R₁ and R₂ are hydrocarbyl from 1 to 12 carbon atoms, inclusive, R₃ is hydrogen, chloro or methyl, R₄ is hydrogen or methyl, and n is 0 or 1.

(e) Metallic derivatives of actyl acetone such as beryllium, aluminum, zirconium, chromium, and iron derivatives thereof as disclosed in U.S. Pat. No. 3,152,131.

(f) Phosphate esters of the formula: (RO)₃PO wherein R is hydrocarbyl from 1 to 12 carbon atoms, inclusive. Such esters and methods for their preparation are disclosed in U.S. Pat. No. 3,056,835. Representative examples are trimethylphosphate, triethylphosphate, ethyldipropylphosphate, triisopropylphosphate, triallylphosphate, triphenylphosphate, and tricresylphosphate.

(g) Phosphine oxides of the formula: R₃PO wherein R is hydrocarbyl from 1 to 12 carbon atoms, inclusive. Representative examples are triethylphosphine oxide, tributylphosphine oxide, triphenyl phosphine oxide, and tris(chloromethyl)phosphine oxide.

(h) Metal complexes derived from a d-group transition element and a π-bonding ligand selected from the group consisting of carbon monoxide, nitric oxide, hydrocarboisocyanides, trihydrocarbylphosphine, trihydrocarbylarsine, trihydrocarbylstilbine, and dihydrocarbylsulfide wherein hydrocarbyl in each instance contains from 1 to 12 carbon atoms, inclusive, provided that at least one of the π-bonding ligands in the complex is carbon monoxide or hydrocarbylisocyanide. Such complexes and methods for the preparation are disclosed in U.S. Pat. No. 3,406,197. Representative examples of such complexes are iron pentacarbonyl, di-iron pentacarbonyl, tungsten hexacarbonyl, molybdium hexacarbonyl, chromium hexacarbonyl, di-manganese decacarbonyl, nickle tetracarbonyl, ruthinium pentacarbonyl, and the complex of iron tetracarbonylmethylisocyanide.

The term "hydrocarbyl" from 1 to 12 carbon atoms, inclusive, employed herein means the monovalent radical obtained by removing one hydrogen atom from a parent hydrocarbon having the stated carbon atom content. Illustrative of such groups are alkyls such as methyl-, ethyl-, propyl-, butyl-, pentyl-, hexyl-, heptyl-, octyl-, nonyl-, decyl-, undecyl-, undodecyl-, including isomeric forms thereof; alkanol such as alkyl, butanol, pentanol, hexanol, heptanol, octanol, nonyl, decanol, undecanol, and dodecanol, including isomeric forms thereof; cycloalkyl such as cyclobutyl, cyclopentyl, cyclohexyl, cycloheptyl, cyclooctyl, and the like; octyls such as cyclopentyl, cyclohexyl, cycloheptyl, and the like. Aralkyl such as benzyl, phenethyl, phenolpropyl, benzhydro, naphthylmethyl, and the like; and aryls such as phenyl, tolyl, xylyl, naphthyl, biphenylyl and the like.

The term "lower alkyl," as used herein, means alkyl from 1 to 6 carbon atoms, inclusive, such as a methyl, ethyl, propyl, butyl, pentyl, hexyl and isomeric forms thereof. Preferred carbodiimide catalysts for use in preparing the compounds of the instant invention are 2-phospholenes. The most preferred carbodiimide catalyst for use in preparing these compounds in accordance with the invention are the 1-aryl-3-lower alkyl-2-phospholene-1-oxide and 1,3-di(Lower alkyl)-2-phospholene-1-oxide. The most preferred species are the 1-phenyl-3-methyl-2-phospholene-1-oxide and 1-ethyl-3-methyl-2-phospholene-1-oxide, and the tris(chloromethyl)phosphine oxide. Organo tin compounds may also be employed in the present invention.

(I) The organo tin compounds which may be employed in the present invention are both quadrivalent and divalent organo tin compounds. The quadrivalent organo tin compounds may be described by the formula:

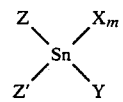

wherein Z and Z' are individual alkyl, aryl, alicyclic, heterocyclic, oxyalkyl or acyloxy group having from 1 to 18 carbon atoms and may be the same or different, X is an alkyl, aryl, alicyclic, heterocyclic, oxyalkyl, an acyloxy, thioalkyl or thioalkylene acyloxy group having 1 to 18 carbon atoms, Y is equal to X or oxy groups or a group represented by the following formula:

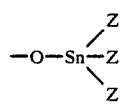

provided that when Y in this group acts as an alkyl or aryl group, M is equal to 1, except when Y is an oxy group then M is equal to 0, and a divalent organo tin compound which may be described by the following formula:

$$Sn(OOCZ'')_2$$

wherein Z" is alkyl, aryl, alicyclic, heterocyclic having from 1 to 18 carbon atoms.

Those quadrivalent organo-tin compounds which may be employed, as described in the formula above, are dibutyl tin dilaurate, dibutyl tin diacetate, dibutyl tin di(2-ethylhexanoate), dioctyl tin dilaurate, dibutyl tin maleate, di(n-octyl)tin maleate, bis(dibutyl actyloxy tin)oxide, bis(dibutyl lauroil oxy tin)oxide, dibutyl tin dibutoxide, dibutyl tin dimethoxide, dibutyl tin dimethoxide, dibutyl tin disalicilate, dibutyl tin bis(isoctylmaleate), dibutyl tin bis(isopropylmaleate), dibutyl tin oxide, tributyl tin acetate, tributyl tin isopropyl succinate, tributyl tin linoleate, tributyl tin nicotinate, dimethyl tin dilaurate, dimethyl tin oxide, dioctyl tin oxide, bis(tributyl tin)oxide, diphenyl tin oxide, triphenyl tin oxide, tri-N-propyl tin acetate, tri-N-propyl tin laurate, and bis(tri-N-propyl tin)oxide, dibutyl tin dilaural mercaptide, dibutyl tin bis(isoctylmercaptoacetate) and bis(triphenyl tin)oxide. Those preferred are dibutyl tin diacetate, dibutyl tin dilaurate, dibutyl tin dilauryl mercaptide, dibutyl tin bis(isoctylmercapto acetate), dibutyl tin oxide, bis(triphenyl tin)oxide, bis(tri-N-butyl tin)oxide. Those divalent organo-tin compounds which may be employed as catalysts as described in the formula above are stannous oxylic, stannous oleate, stannous naphthanate, stannous acetate, stannous buterate, stannous 2-hexylhexanoate, stannous laurate, stannous palmitate, and stannous stearate and mixtures thereof. The preferred divalent tin compounds are stannous oxylate, stannous oleate and stannous-2-ethyl hexanoate, and mixtures thereof.

The temperature ranges which may be employed for the carbodiimide-uretonimine formation reactions range from 50° C. to 250° C. and preferably from 60° C. to 230° C.

The reaction product may be treated at the reaction temperature or lower with catalyst deactivators which include salts such as magnesium chloride dihydrate, acid chlorides such as benzoyl chlorides and acetyl chlorides, acids such as hydrochloric acid, oxalic acid, phosporicacid, benzenesulfonic acid, toluenesulfonic acid, methanesulfonic acid or trifluoromethane sulfonic acid, sulfonyl chlorides such as benzenesulfonyl chloride, toluenesulfonyl chloride and the like. Other deactivators which may be employed are such agents as dimethylsulfate, alkyl o,p-toluenesulfonates, methylchloride and similar compounds as disclosed in U.S. Pat. No. 3,769,318.

Carbodiimide, uretonimine-containing modified isocyanates thus formed may be blended with a two-ring MDI such as 4,4'-MDI, 2,4'-MDI and mixtures thereof. The blending achieves a two-ring content in the final product of over about 60 percent of the total ring content, and yet maintains the viscosity of the composition around 200 mPas. The products prepared accordingly display viscosities of around 200 mPas. The isocyanate content is comparable to standard polymeric MDI.

It has been surprisingly found that another advantage of the present invention is that by blending a two-ring MDI into the carbodiimide-uretonimine-modified polyisocyanate, it is possible to use this material to form a lighter color foam which is useful in foam packaging applications. The foams may be prepared as is known in the art by the catalytical reaction of the carbodiimide-uretonimine-modified polyisocyanate with a polyol in the presence of blowing agents, surfactants and other additives which may be deemed necessary. Noncellular products such as known in the art may also be prepared in the absence of blowing agents.

In accordance with the present invention, rigid and flexible foams may be prepared by the catalytic reaction of the modified organic polyisocyanate with polyols in the presence of blowing agents, surfactants and other additives which may be deemed necessary. Typical polyols which may be employed in the preparation of the foams of the instant invention include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetyls, aliphatic polyols or diols, ammonia, and amines including aromatic, aliphatic and heterocyclic amines as well as mixtures thereof. Alkylene oxide adducts of compounds which contain two or more different groups within the above-identified classes may be used such as amino alcohols which contain an amino group and a hydroxyl group. Also, alkylene oxide adducts of compounds which contain 1-SH group and 1-OH group as well as those which contain an amino group and a —SH group may be used. Generally, the equivalent weight of the polyols will vary from 100 to 10,000, and preferably from 1000 to 3000.

Any suitable hydroxy-terminated polyester may be used such as are obtained, for example, from polycarboxylic acids and polyhydric alcohols. Any suitable polycarboxylic acid may be used such as oxolic acid, malonic acid, succinic acid, glutaric acid, adipic acid, palmelic acid, suberic acid, azelaic acid, subacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta-diethylsuccinic acid, isophthalic acid, terephthaic acid, hemimellitic acid, and 1,4-cyclohexane dicarboxylic acid and mixtures thereof. Any suitable polyhydric alcohol may be used such as ethylene glycol, propylene glycol, trimethylglycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, alpha-methyl glucoside, pentaerythritol and sorbitol and mixtures thereof. Also included within the term "polyhydric alcohol" are compounds derived from phenol such as 2,2-bis(4-hydroxyphenyl)propane, commonly known as bis-phenol A.

Any suitable polyoxyalkylene polyether polyol may be used as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from either starting materials such as tetrahydrofuran and alkylene oxide-tetrahydrofuran mixtures; epihalohydrins such as epichlorohydrin; as well as arylalkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Würtz in 1859 and *Encyclopedia of Chemical Technology*, vol. 7, pages 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-bis(4-hydroxyphenyl)propane and blends thereof having equivalent weight of from 100 to 5000.

Suitable polyhydric polythio ethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amine alcohol such as ethanol amine with the polycarboxylic acids set forth above or they may be made using the same components that make up the hydroxyl-containing polyesters with only a proportion of the components being a diamine such as ethylenediamine.

Polyhydroxyl-containing phosphorous compounds which may be used include those compounds disclosed in U.S. Pat. No. 3,639,542. Preferred polyhydroxyl-containing phosphorus compounds are prepared from alkylene oxides and acids of phosphorus compounds are prepared from the alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above. Suitable aliphatic thiols which may be condensed with alkylene oxides include alkane thiols containing at least 2-SH groups as 1,2-ethane dithiol, 1,2-propane dithiol, 1,3-propane dithiol, and 1,6-hexane dithiol; alkane thiols such as 2-butene-1,4-dithiol; and alkane thiol such as 3-hexane-1,6-dithiol.

Suitable amines which may be condensed with alkylene oxides include aromatic amines such as aniline, o-chloro aniline, p-amino aniline, 1,5-diamino naphthalene, methylene dianiline, the condensation products of aniline and formaldehyde, and diamino toluene; aliphatic amine such as methylamine, trisisopropanolamine, ethylenediamine, 1,3-diaminopropane, 1,3-diaminobutane, and 1,4-diaminobutane.

The polyurethane foams of the present invention may also be prepared by the reaction of a graft copolymer polyol with a carbodiimide- and uretonimine-containing polyisocyanate of the instant invention in the presence of a blowing agent and optionally in the presence of additional polyhydroxyl-containing components, chain extending agents, catalysts, surface active agents, stabilizers, dyes, fillers and pigments. Suitable processes for the preparation of cellular polyurethane plastics are disclosed in U.S. Pat. No. Re. 24,514 together with suitable machinery to be used in conjunction therewith.

For the preparation of microcellular foams, blowing agents are generally not necessary. If desired for more expanded foams, they may be employed. When water is added as the blowing agent, corresponding quantities of excess isocyanate to react with the water and the product, carbon dioxide may be used.

It is possible to proceed with the preparation of the polyurethane plastics by a prepolymer technique wherein an excess of organic polyisocyanate of the instant invention is reacted in a first step with a polyol to prepare a prepolymer having free isocyanate groups which is then reacted in a second step with water to prepare foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Chain extending agents which may be employed in the preparation of the polyurethane foams include those compounds having at least two functional groups bearing active hydrogen atoms such as water, hydrozene, primary and secondary diamines, amino alcohols, amino acids, hydroxy acids, glycols or mixtures thereof. A preferred group of chain extending agents includes water, ethylene glycol, 1,4-butanediol, and primary and secondary diamines which react more readily with the polyisocyanates of the instant invention than does water. These include phenylenediamine, ethylenediamine, diethylenetriamine, N-(2-hydroxypropyl)ethylenediamine, N,N'-di(2-hydroxypropyl)ethylenediamine, piperazine, 2-methylpiperazine.

Any suitable catalyst may be used including tertiary amines such as, for example, triethylenediamine, N-methylmorpholine, N-ethylmorpholine, diethyl amino ethanol, N-lauryl morpholine, 1-methyl-4(dimethylaminoethyl)piperazine, 3-methoxy-N,N'-dimethylpropylamine, N,N,N'-trimethylisopropyl propylene diamine, N,N,N',N'-tetraethylpropylenediamine, dimethylbenzylamine, mixtures thereof, and the like. Other suitable catalysts are, for example, tin compounds such as stannous chloride, tin salts of carboxylic acids, such as dibutyl tin di-2-ethyl hexanoate and stannous octoate, as other organic metallic compounds such as are disclosed in U.S. Pat. No. 2,846,408.

If desired, a surface active agent may be employed. Numerous surface active agents have been found satisfactory. Nonionic surfactants are preferred. Of these, the nonionic surface active agents prepared by the sequential addition of propylene oxide and then ethylene oxide to the propylene glycol and the solid or liquid organo silicones have been found particularly desirable. Other surface active agents which are operative, although not preferred, include polyethylene glycol ethers of long chain alcohols, tetra amine or alkanol amine salts of long chain alkyl acid sulfate esters, alkyl sulfonic esters, and alkyl arylsulfonic acids.

The following examples are offered to illustrate various aspects of the invention. Those skilled in the art will appreciate that they are not limiting to the scope and spirit of the invention and various and obvious modifications will occur to those skilled in the art.

EXAMPLE 1

Preparation of Polymethylene Polyphenylene Polyisocyanate Compositions Containing Carbodiimide, Uretonimine Linkages A thousand parts of polymethylene polyphenylene polyisocyanate having a viscosity of 208 mPas at 25° C. were charged into a reaction vessel equipped with a stirrer and heating means. The entire reaction was conducted under a nitrogen atmosphere with continuous agitation of the reaction contents. To the polyisocyanate 0.0998 part of phospholene oxide catalyst solution was added to start with and the reaction contents were heated to 110° C. The remainder of the reaction profile is as shown below.

| Time at 110° C. from Start | NCO, % | Remarks |
|---|---|---|
| 2 hr | 30.99 | add 0.1997 part phospholene oxide catalyst solution |
| 4 hr | 30.25 | add 0.71 part phospholene oxide catalyst solution |
| 6 hr | 28.35 | — |
| 8 hr | 25.30 | 5 parts of a solution - trifluoromethane sulfonic acid added to deactivate catalyst. |

As indicated, the final product has an NCO content of 25.3 percent and was viscous. The infrared spectrum of the flowable viscous product indicated the presence of carbodiimide and uretonimine linkages. The reaction is completed at the end of 8 hours. The viscosity of the final product is over 100,000 mPas.

Preparation and Use of the Polyisocyanate Compositions of the Present Invention The above carbodiimide, uretonimine containing isocyanate was divided into five portions and blends with two-ring isocyanates were made to obtain the desired viscosity and two-ring content.

Foams were prepared as follows:

| Formulation | |
|---|---|
| Component A | Wt. % |
| Polyol A | 74.32 |
| DC 193 | 1.49 |
| Polycat 8 catalyst | 1.11 |
| Dibutyltin dilaurate catalyst | 0.04 |
| Water | 0.74 |
| Chlorotrifluromethane | 30.00 |
| Component B | |
| Polyisocyanate | 110 index |

Foam Preparation

Component A and component B were mixed under high speed agitation for 10–15 seconds in a 500 ml container and poured into a 2.0 liter paper container. The free-rise foam thus obtained was allowed to cure under ambient indoor conditions for two hours and cut to examine the color of the core of the foam. The results are shown in Table I.

Polyol A is ethylene and propylene oxide adduct of toluenediamine containing 30 weight percent ethylene oxide with a hydroxyl number of 390.

DC 193 is polyalkylsiloxane-polyalkylene copolymer, a foam stabilizer.

Polycat 8 is N,N-dimethylcyclohexylamine catalyst available from Air Products.

Foams were prepared from the above isocyanates for comparison. The data are shown in Table I.

TABLE I
CARBODIIMIDE, URETONIMINE-MODIFIED POLYMETHYLENE POLYPHENYLENE POLYISOCYANATES

| | Example | | | | |
|---|---|---|---|---|---|
| Isocyanate | 2 | 3 | 4 | 5[A] | 6[B] |
| Isocyanate of Ex. 1, % | 50 | 50 | 30 | — | — |
| 4,4'-methylene bis(phenylisocyanate) | 50 | 40 | 60 | — | — |
| Mixture of 4,4'- and 2,4'-methylene bis(phenylisocyanate) | — | 10 | 10 | — | — |
| Properties | | | | | |
| NCO, % | 28.8 | 28.7 | 29.7 | 30–32 | 30–32 |
| Viscosity, mPas/25° C. | 402 | 390 | 75 | 170–220 | 50–80 |
| Total 2-ring MDI, calculated | 60 | 60 | 80 | 44–46 | 60–65 |
| Storage for 6 mos. at 25° C. | stable | stable | stable | stable | stable |
| Foam color | light | light | light | dark | dark |

[A]Standard viscosity of polymethylene polyphenylene polyisocyanate having a viscosity of 170–220 mPas at 25° C.
[B]Low viscosity polymethylene polyphenylene polyisocyanate having a viscosity of from 50–80 mPas at 25° C.

Example 2 shows the effect of a 50-50 mixture of the carbodiimide-uretonimine modified polyisocyanate and 4,4'-methylene bis(phenylisocyanate). The resulting product has a viscosity of about 400, and a total two-ring content of about 60 percent and is storage stable at 25° C. as well as 0° C. The foam produced was a light tan color.

Example 3 shows the effect of varying the percentage of the two-ring content in a 50-50 mixture as in Example 2. It is noted that the viscosity is comparable to Example 2, and the foam produced had physical properties similar to the foam of Example 2.

Example 4 shows that the two-ring content can be as high as 80%, and still provide a material comparable to low viscosity PMDI. The product produces very light colored foam, whereas standard PMDI produces a darker colored foam.

Examples 5 and 6 are comparative examples showing foams made with standard and low viscosity polymethylene polyphenylene polyisocyanate.

The embodiments of the invention in which an exclusive property or privilege is claimed are defined as follows:

1. A method for the preparation of a storage stable liquid carbodiimide-uretonimine modified polymethylene polyphenylene polyisocyanate composition, containing a high two-ring methylene bis(phenylisocyanate) content and having a viscosity comparable to polymeric methylene bis(phenylisocyanate), comprising:
   (a) catalyzing polymeric MDI with a catalytically effective amount of a carbodiimide-uretonimine linkage promoting catalyst at a temperature sufficient to promote the formation of said linkages until an isocyanate content of about 25 percent is obtained;
   (b) deactivating the carbodiimide-uretonimine linkage catalyst; and, (c) blending the product of (b) with a two-ring methylene bis(phenylisocyanate) in an amount sufficient to raise the two-ring isocyanate content to about 60 percent of the total ring content;

whereby said liquid carbodiimide-uretonimine modified polyisocyanate composition has a viscosity comparable to standard polymeric MDI.

2. The method of claim 1, wherein the liquid carbodiimide-uretonimine modified polyisocyanate has a viscosity from about 150 to 2000 mPas.

3. The method of claim 1, wherein the formation temperature of the carbodiimide-uretonimine linkages of (a) is about 50° to 250° C.

4. The method of claim 1, wherein the methylene bis(phenylisocyanate) is selected from the group consisting of 2,2'-methylene bis(phenylisocyanate), 2,4'-methylene bis(phenylisocyanate), 4,4'-methylene bis(phenylisocyanate), urethonimine modified methylene bis(phenylisocyanate), and mixtures thereof.

5. The method of claim 1, wherein the methylene bis(phenylisocyanate) is a blend comprised of about 0–100 percent of 4,4'-methylene bis(phenylisocyanate), about 0–10 percent of 2,2'-methylene bis(phenylisocyanate), about 0–50 percent of 2,4'-methylene bis(phenylisocyanate), about 0–50 percent of uretonimine modified methylene bis(phenylisocyanate), whereby the total amount of the two-ring MDI of the composition is at least 60 percent of the total ring content.

6. A method for the preparation of a liquid carbodiimide uretonimine modified polymethylene polyisocyanate composition containing a two ring content and viscosity comparable to standard polymeric methylene bis(phenylisocyanate), comprising blending carbodiimide uretonimine modified methylene bis(phenylisocyanate) with an amount methylene bis(phenyisocyanate) sufficient to raise the two-ring isocyanate content of the blend to about 60 percent.

7. The method of claim 6, wherein the methylene bis(phenylisocyanate) is selected from the group consisting of 2,2'-methylene bis(phenylisocyanate), 2,4'-methylene bis(phenylisocyanate), 4,4'-methylene bis(phenylisocyanate) uretonimine modified methylene bis(phenylsiocyanate) and mixtures thereof.

8. A light colored flexible or rigid polyurethane foam, comprising a carbodiimide-uretonimine modified polymethylene polyphenylene polyisocyanate composition having a two-ring content of about 60 percent, an active hydrogen compound, blowing agents and surfactants.

9. The foam of claim 8, further including crosslinking agents.

* * * * *